No. 857,665.
PATENTED JUNE 25, 1907.
W. H. PERKINS.
PARASOL TOP.
APPLICATION FILED APR. 20, 1907.
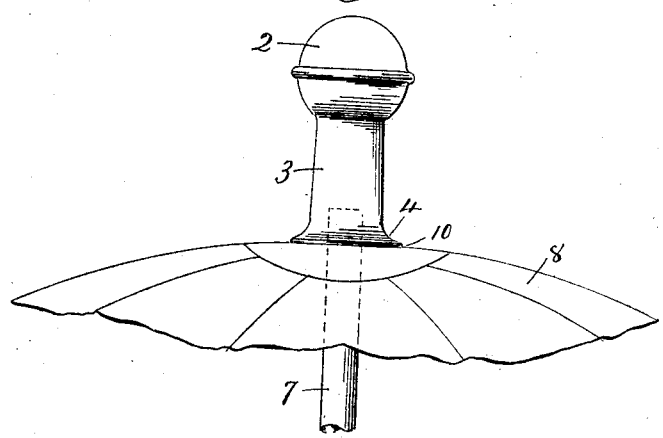
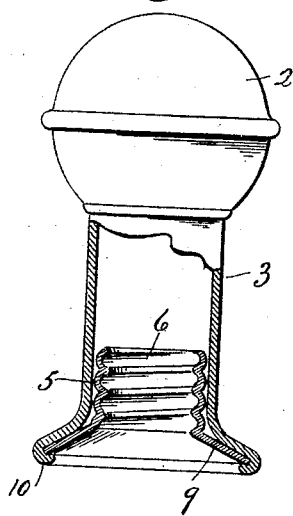
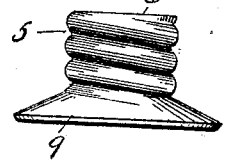
Witnesses:
J. H. Shumway
C. J. Reed.
Walter H. Perkins
Inventor
By atty Seymour & Earle

UNITED STATES PATENT OFFICE.

WALTER H. PERKINS, OF WATERBURY, CONNECTICUT, ASSIGNOR TO THE WATERBURY MFG. CO., OF WATERBURY, CONNECTICUT, A CORPORATION.

PARASOL-TOP.

No. 857,665.	Specification of Letters Patent.	Patented June 25, 1907.

Application filed April 20, 1907. Serial No. 369,282.

*To all whom it may concern:*

Be it known that I, WALTER H. PERKINS, a citizen of the United States, residing at Waterbury, in the county of New Haven and State of Connecticut, have invented a new and useful Improvement in Parasol-Tops; and I do hereby declare the following, when taken in connection with the accompanying drawings and the letters of reference marked thereon, to be a full, clear, and exact description of the same, and which said drawings constitute part of this specification, and represent, in—

Figure 1 a side view of a portion of a parasol showing my improved top attached thereto. Fig. 2 a side view partially in section of a parasol top constructed in accordance with my invention, shown on an enlarged scale. Fig. 3 a side view of the nut detached.

This invention relates to an improvement in parasol tops, particularly tops for parasols for baby carriages, and especially to that class which are formed to be screwed on to the threaded end of a central rod and be gripped by a holder. These tops are usually formed from sheet metal and a nut soldered or otherwise secured within the shell for engagement with the threaded end of the central rod.

The object of this invention is to cheapen the construction and avoid the difficulty of soldering the nut within the shell; and the invention consists in the construction hereinafter described and particularly recited in the claims.

In carrying out my invention, I employ a top of substantially usual design, herein shown as comprising a ball head 2, shank 3 with an outwardly extending flange 4 at the bottom. Within the shank I locate a nut 5 and this nut is drawn up from sheet metal to comprise a sleeve 6 which is threaded for engagement with the upper end of the central rod 7 of the parasol 8. Around this sleeve is an outwardly flaring flange 9 adapted to be seated in the flaring mouth of the stem 3, and the edge 10 of the stem flange is turned over the flange 9 so as to interlock the nut with the stem. As before stated the nut thus formed may be drawn or struck up from sheet metal and the threads may be rolled therein, and it will be seen that the nut is secured within the top without the use of soldering.

I claim:—

The herein described parasol top comprising a tubular shank having an outwardly flaring mouth, a sheet metal nut located within said shank and comprising a threaded sleeve, and an outwardly flaring flange the edge of the stem flange closed over the edge of the nut flange, substantially as described.

In testimony whereof, I have signed this specification in the presence of two subscribing witnesses.

WALTER H. PERKINS.

Witnesses:
ADOLPH RECKER,
RAYMOND PALMER.